United States Patent
Koppolu et al.

(10) Patent No.: US 6,268,924 B1
(45) Date of Patent: Jul. 31, 2001

(54) DOCUMENT OBJECT HAVING A PRINT INTERFACE FOR PROGRAMMATIC AUTOMATION BY A USING PROGRAM

(75) Inventors: Srinivasa R. Koppolu, Redmond; Robert G. Atkinson, Woodinville; Nathaniel Brown; Richard J. Wolf, both of Seattle; Matthew William Pearson, Kirkland, all of WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/656,977

(22) Filed: Jun. 6, 1996

(51) Int. Cl.⁷ .................................................. G06F 15/00
(52) U.S. Cl. ......................................... 358/1.13; 358/1.15
(58) Field of Search ................................. 395/114, 200, 395/113, 800, 348, 112, 683, 703; 345/343, 349, 356; 364/242.95, 940.62, 975.1, 235; 358/1.15, 1.13

(56) References Cited

U.S. PATENT DOCUMENTS

| 5,495,561 | * | 2/1996 | Holt | 395/114 |
| 5,559,933 | * | 9/1996 | Boswell | 395/114 |
| 5,566,278 | * | 10/1996 | Patel et al. | 395/114 |
| 5,608,909 | * | 3/1997 | Atkinson et al. | 395/703 |
| 5,699,495 | * | 12/1997 | Suipp | 395/114 |
| 5,805,885 | * | 9/1998 | Leach et al. | 395/683 |

OTHER PUBLICATIONS

Richter, "Fusing Your Applications to the system Through the Windows© 95 Shell," *Microsoft Systems Journal*, vol. 11, No. 4, pp. 61–66, 68–70 (Apr. 1996).

\* cited by examiner

*Primary Examiner*—Joseph Mancus
*Assistant Examiner*—Douglas Tran
(74) *Attorney, Agent, or Firm*—Klarquist Sparkman Campbell Leigh & Whinston, LLP

(57) ABSTRACT

A server application associated with a document provides a document object with a print interface to support programmatic document printing. A client application interacts with the document object through the print interface to control printing. The print interface supports progress monitoring and print cancellation during printing using a call back interface of the client program. The print interface also supports opaquely conveying document-specific print options, so that the client program can perform subsequent print operations with the same or similar document object using the same print options without the client program manipulating the print options. The document object also has a print preview interface which supports programmatic print previewing.

13 Claims, 6 Drawing Sheets

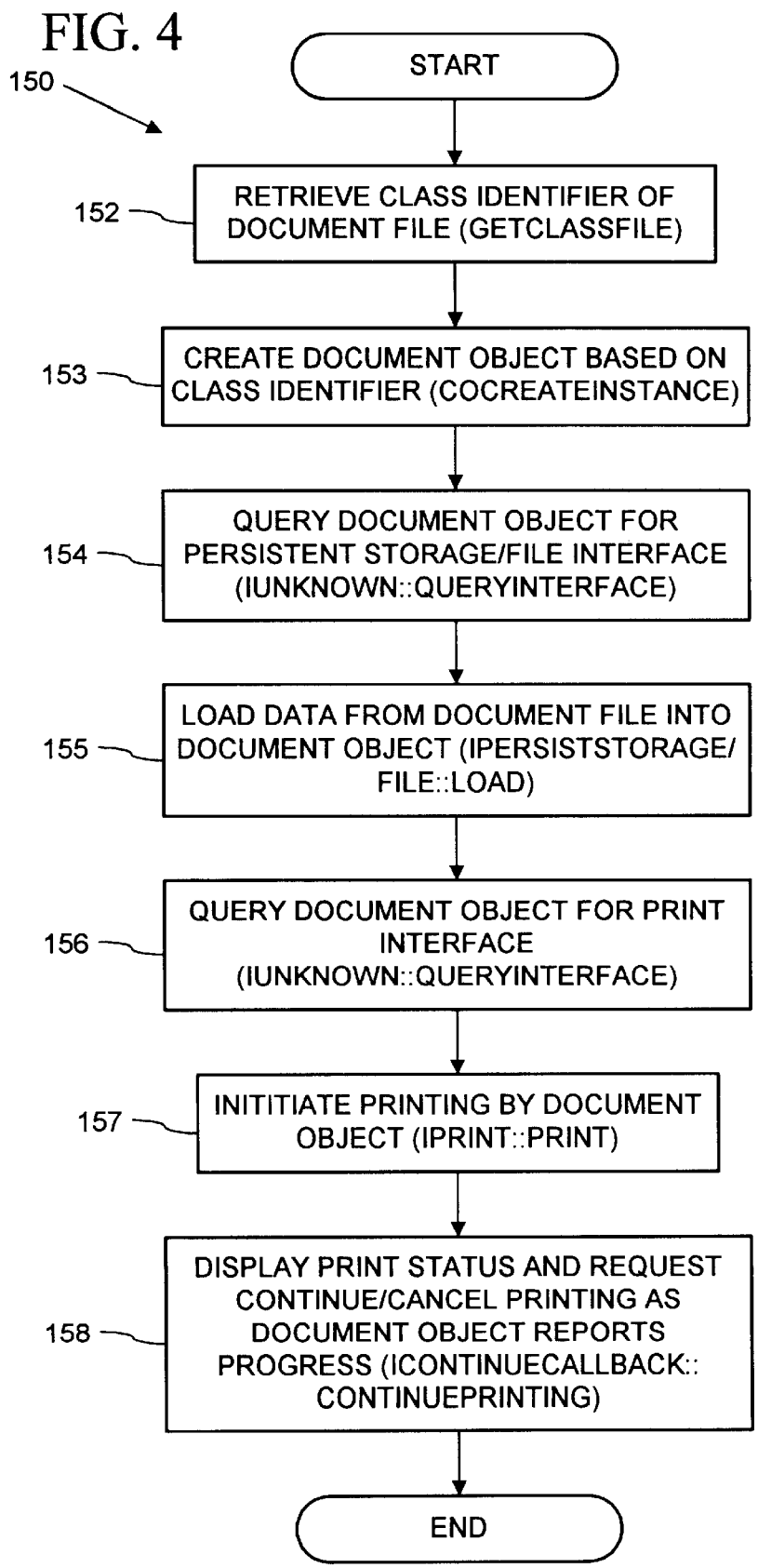

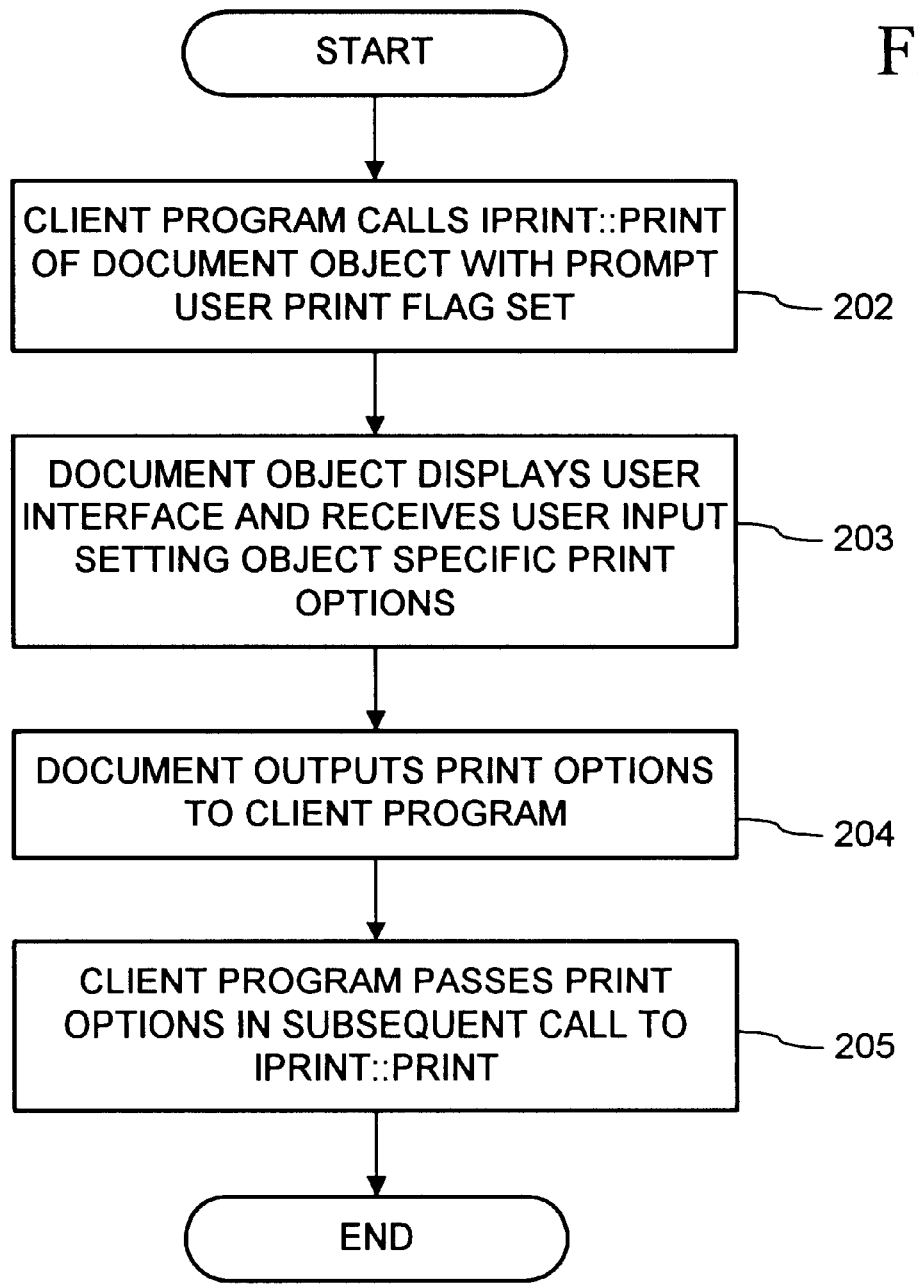

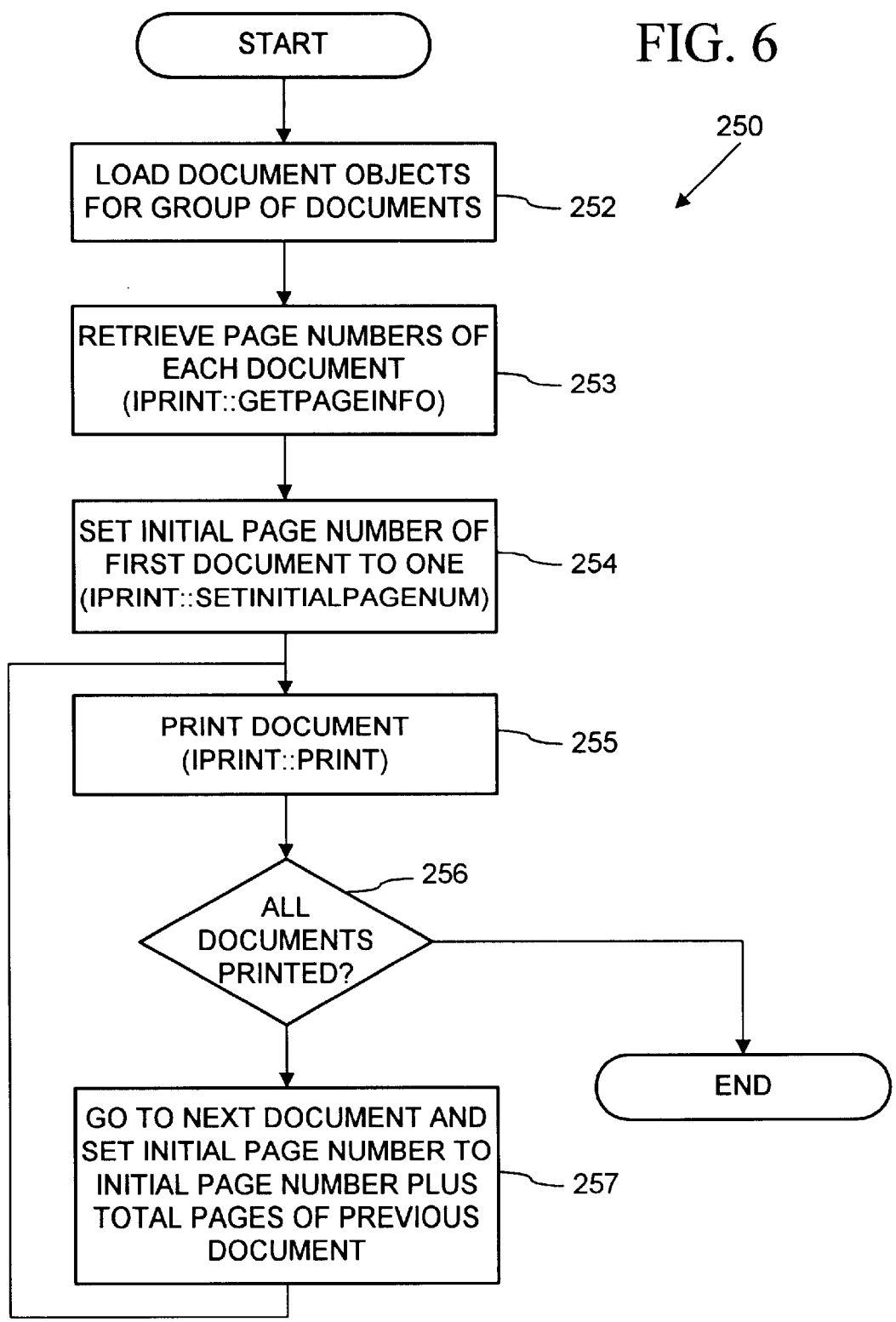

DOCUMENT OBJECT HAVING A PRINT INTERFACE FOR PROGRAMMATIC AUTOMATION BY A USING PROGRAM

FIELD OF THE INVENTION

This invention relates to methods and systems for programmatically controlling printing of documents by associated application programs on a computer.

BACKGROUND AND SUMMARY OF THE INVENTION

Computer documents generally have formats which are specific to a particular application program (e.g., Microsoft® Word, Microsoft® Excel, etc.) with which they are created. By convention, the documents' file names have a three letter extension which identifies their file format and associated application program. For example, Microsoft® Excel spreadsheet documents have an ".xls" file name extension. Drawing documents created in Shapeware Corporation's VISIO® drawing application program have a ".vsd" file name extension.

These often proprietary format documents typically can only be printed correctly by their associated application program. Users therefore usually print documents by interacting directly with the documents associated application. This requires the user to perform several steps, including: identifying, finding and launching the associated application; opening the document in the application; setting print options; and activating the application's print feature. For the user to avoid this tedious sequence of steps, it often is desirable to allow another computer program (e.g., the operating system or a printing utility) to control printing by the documents associated application. Programmatic printing refers to capability of a computer program (typically the operating system shell, but also other computer programs) to cause a document's associated application program to print the document on a printer.

Various forms of programmatic printing have been available in computer operating systems which provide a graphical user interface (GUI), e.g., Microsoft Windows® 3.x/95/NT, Apple Macintosh, IBM OS/2, and NewWave. In one or more of these operating systems, the user has been able to drag (e.g., using a mouse) an icon representing a document's file from folders of a file system onto an icon representing a printer to cause the associated application to print the document on the printer. The user thus reduces the multiplicity of steps otherwise required to print a document to a single drag and drop of a document icon with the mouse.

The designs of the programmatic printing features in these prior operating systems, however, have had certain deficiencies. In the Microsoft Windows® operating system for example, the operating system shell (i.e., the program which provides the operating system's graphical user interface) implements programmatic printing using a shell execute command. Shell execute commands are text string commands (e.g., MS-DOS commands) issued to the operating system command interpreter (i.e., the "command.com" program in Microsoft Windows®). The operating system includes a registry database which maps a document's file name extension to a particular application, and also maps the application to a particular shell execute command for printing the document. For example, the following sample registry entries in Microsoft Windows® 95 map the file name extension of Microsoft® Word documents (i.e., ".doc") to a shell execute command:

HKEY_CLASSES_ROOT\.doc wordfile

...

HKEY_CLASSES_ROOT\wordfile\Shell\print\Command c:\winword\winword6.exe -p %1

Thus, in response to the user dragging a Word document icon onto a printer icon in the Windows graphical user interface, the Windows shell maps the document's ".doc" file name extension to the text string "c:\winword\winword6.exe -p %1" from the above sample registry entries. The shell then substitutes the document's file name for the "%1" argument of the text string, and issues the string as a shell execute command to the Windows command interpreter. This command directs the command interpreter to load the Microsoft® Word executable program, and to pass the print flag ("-p") and the document's file name to the program as command line arguments. These command line arguments direct the Word program to print the document when the program begins executing.

A drawback to programmatic printing with the shell execute command is that it is essentially a one-way, "throw over the fence" mechanism. That is to say, once the Windows® shell or other controlling program initiates printing with a shell execute command, it has no further control of the application program which performs the print operation and it receives no information back from the application on the progress, success or failure of the print operation. Thus, the controlling program cannot report the status of the print operation to the user, and cannot suspend, cancel, or otherwise affect or control the print operation once initiated. When launched from a shell execute command, the associated application generally does not provide a user interface for controlling the print job. (Applications launched with a print flag as a command line argument generally are expected to print the specified document without user interaction.) Thus, the print job typically can only be canceled by the printer's driver program (e.g., through a separate print manager utility program which interacts with the printer's driver), or by physically turning the printer off.

Since there is a lack of sufficient feedback from the application when the print operation completes, the controlling program also cannot terminate the application after the print operation is complete, but instead must rely on the application program to terminate at print operation completion. The programmatic printing feature of the Windows® operating system assumes that application programs which are launched with a print flag as a command line argument will terminate after the print operation completes. However, only about half of the application programs which accept a print flag as a command line argument actually are designed to terminate when the print operation completes. Those applications which are not designed to terminate at print operation completion continue consuming computer resources (i.e., memory, processing cycles, etc.), although no longer in use, until terminated manually by the user.

The prior programmatic printing feature using the shell execute command also has the flaw that the shell has no control over the associated application displaying its user interface. Once the shell execute command is issued, the associated application takes over and can display graphic elements, such as a starting graphic while loading, the application's print options dialog, or a complete application window. The Windows® shell assumes that applications which are loaded with the print flag as a command line argument do not display graphic elements. Many applications, however, violate this assumption. The graphic elements they display can obscure other work the user is performing with the shell, and are generally unexpected by the user. When the user drags a document icon onto a printer icon, the user often understands only that they are working in the Windows® shell program and may not realize that the actual print operation activated by the drag and drop action is being carried out behind the scenes by the document's associated application. The display of graphic elements by the associated application destroys this illusion, and typically is not the expected result of the user's drag and drop action. The graphic elements also may obstruct the user from performing other work in the shell.

Another drawback to the shell execute programmatic printing feature is that the Windows® shell has extremely limited control over the actual print operation. In fact, the only direct control that the shell has over the print operation is which document is printed by its associated application. The mapping from file name extension to shell execute command allows the shell to specify only the file name of the target document to the application. The mapping to a shell execute command does not allow the shell to specify any other aspects of the print operation to the application. Thus, the shell is unable to set any print options, such as the paper orientation (e.g., landscape or portrait orientations), the printer paper tray, any document specific options (e.g., which pages), or even which printer is used.

The Windows® shell works around the latter limitation (of not being able to specify which printer to use through the shell execute command) indirectly by temporarily changing the operating system's default printer setting. The shell's programmatic printing feature assumes that the application programs which are launched with a print flag as a command line argument perform the print operation on the default printer set by the operating system. Thus, by changing the default printer setting before issuing the shell execute command, the shell can cause the associated application launched with the shell execute command to print to any desired printer. However, although the assumption that the application prints to the default printer is generally true, temporarily changing the default printer setting can have undesirable or even disastrous results.

First, since there is no direct feedback from the associated application, the Windows® shell cannot reliably determine when the associated application completes printing the document so as to restore the original default printer setting. The shell can monitor the activity of the printer drivers in an attempt to indirectly determine when the document has completed printing. However, due to the possibility of the printer having other print jobs pending, this indirect determination is sometimes inaccurate.

Second, Microsoft Windows® is a multi-tasking operating system, which means that multiple programs can execute concurrently on the system. When the Windows® shell changes the default printer setting, the default printer is changed for all applications. Many applications, however, contemporaneously format documents that they have open according to the current default printer setting. Thus, temporarily changing the default printer setting by the shell's programmatic printing feature may cause these applications to immediately reformat their open documents according to the new default printer setting, and again reformat their open documents when the shell restores the original default printer setting, thereby providing unpredictable behaviour and wasting resources.

Third, changing the default printer setting can cause print jobs to be unexpectedly redirected to another printer. Applications typically present a user interface dialog with controls that show and allow the user to select various print options, including the destination printer. An unfortunate timing sequence can occur where the shell's programmatic printing feature changes the default printer setting after the user has selected the default printer as the destination of a separate print job in some application's print options dialog and before the user initiates that print job. In this case, the user expects the print job to go to the original default printer shown in the print options dialog, but instead the print job is redirected with the programmatic printing feature's print job to the new temporary default printer. On a local area network having many printers in diverse locations such as is common in many large businesses, it can be very confusing for the user to determine where the print job was printed (and why).

Further, changing the default printer setting by the shell's programmatic printing feature while another print job is being printed to the default printer may also cause the operating system to "crash" (i.e., to become inoperative). This situation can occur where the user drags a first document's icon onto a first printer's icon, and then drags a second document's icon onto a second printer's icon while the first document's application begins printing to the default printer. The shell's programmatic printing feature, by changing the default printer setting to the second printer in the middle of the first document's print operation, may cause the operating system to crash.

Prior programmatic print previewing features also have had many flaws. Print previewing refers to a feature which produces a display or internal data representation of the document as it would appear when printed. This allows the user to view the document for errors before printing. Print previewing also can produce a small graphic image of the document (referred to as a "thumbnail") which is useful for document management, e.g., to allow the user to select documents from a collection based on its appearance from a set of thumbnails of the documents in the collection, rather than a file name or other identification.

A typical prior programmatic print preview feature uses the previous programmatic printing with the shell execute command, and further substitutes a custom printer driver for the default printer. The custom printer driver feeds page images directly to the client in a private data format conducive to the client's needs. The approach has the drawback that the custom printer driver generally is modeled on a generic printer, and does not necessarily reflect how the document will appear on a specific printer. Since a document's appearance can vary significantly between printers, this approach often does not accurately preview the document as it will appear on a specific printer. Thus, the print preview obtained from this approach may appear without errors, while the document may not have the desired appearance when printed on the specific printer.

Microsoft Corporation's Object Linking and Embedding (OLE) component software technology provides many useful techniques which allow different computer programs to work together. In conformance with OLE specifications, data such as for a computer document is combined with associated program code that operates on the data to form an entity referred to as an object. Objects in OLE include interfaces through which other programs can interact with the object. The interfaces have member functions (also referred to as methods on the interface) that the programs can invoke directly as a function call. OLE defines many different interfaces which allow application programs to provide features such as embedding and linking of non-native data formats into compound documents (e.g., inserting a Microsoft® Excel spreadsheet and a VISIO® drawing into a Microsoft® Word document); in-place activation and editing of embedded or linked data in the compound document; inter-application copy, cut and paste operations; inter-application drag and drop operations; and others. OLE, however, has not previously provided support specifically for programmatic document printing.

The present invention provides an object interface structure for programmatic document printing which overcomes the above described flaws of previous programmatic document printing feature designs. The object interface structure defines a print interface to objects (hereafter "document objects") which encapsulate document data and program code (i.e., a set of functions) for operating on the data. A client application program (e.g., an operating system shell or other program which provides a programmatic document printing feature) interacts with the document object through the print interface and can cause the object to print its document data by performing a function call to a print member function on the interface.

According to a first aspect of the invention, the object interface structure may provide continuing interaction between the client application and the document object. In the illustrated object interface structure, the client application includes a call back interface. At the time the client application makes its call to the print function on the document object's print interface, the client application passes a call back interface pointer to the document object. The document object can then interact with the client application by calling member functions on the call back interface of the client application. The document object calls functions on the client's call back interface to notify the client application of the status of the print operation, including the progress, success or failure of the print operation. Thus, the client can, if desired, display graphical user interface elements indicating the print operation status, such as a "% complete" progress indicator, and success or failure notification dialogs. The client also can participate in the print operation by returning values from the document object's calls to the call back interface that cause the document object to cancel, resume, suspend, or otherwise modify, or monitor the print operation.

According to another aspect of the invention, the object interface structure provides the client with control over aspects of the print operation beyond the determination of which document is printed. In the illustrated object interface structure, the document object's print interface also has member functions which the client calls to query information about the document's page numbers and to set the range of page numbers to be printed. The client passes flags as an argument in calls to the print member function to control aspects of the print operation, such as display of graphical user interface elements by the document object or printing to a particular printer or file. The print member function also accepts a data structure as an argument which contains document specific print options. This data structure has an extensible format to allow inclusion of any number and types of values to control print options specific to a particular document.

In accordance with further aspects of the invention, the object interface structure supports various programmatic printing methodologies not possible with the shell execute command and like previous programmatic printing features. As an example, with the illustrated print interface, the client application can opaquely convey document specific print options to document objects. Specifically, the client can make a first call to the print interface of a first document object to cause that document object to display its print options dialog and gather a set of print option settings from the user. The client can then pass the same set of print options settings gathered from the call to the first document object in calls to the print interfaces of other like document objects so as to programmatically print their documents using the same print option settings, but without repeatedly prompting the user to set the print options of those documents. The client simply passes the print option settings data structure (as essentially a "bit bucket") in its calls to the print interface of each document object, and need not manipulate the print option settings itself. Thus, the client can convey print option settings between document objects with a complex group of print options (e.g., for a high-end computer aided design program) and document objects with simple print options (e.g., for a basic word processor) alike, using the same interface design and without having to include logic in its code specific to a particular document's print options.

As a further example, the client application can print a group of separate documents with consecutive page numbering from document to document. The print interface includes a member function for setting the initial page number of the document. The client application calls this function to set the initial page number of each document in the group to have consecutive page numbers from document to document.

According to yet another aspect of the invention, the object interface structure also defines a print preview interface to document objects which supports gathering print previews of documents. Client applications can interact with a document object's print preview interface to gather data for displaying a preview of the appearance of a document when printed on a particular printer. This print preview feature is useful to allow the user to verify that a document will have a desired format and appearance when actually printed on the printer, and also can be used for document management applications (e.g., to display a "thumbnail" graphic of the document).

Additional features and advantages of the invention will be made apparent from the following detailed description of an illustrated embodiment which proceeds with reference to the accompanying drawings.

BRIEF DESCRIPTION OF THE DRAWINGS

FIG. 4 is a flow chart illustrating a method of programmatically printing a document with the object interface structure of FIG. 3.

FIG. 5 is a flow chart illustrating a method of opaquely conveying document specific print options in the method of FIG. 4.

FIG. 6 is a flow chart illustrating a method of programmatically printing a group of document with consecutive page numbering using the object interface structure of FIG. 3.

DETAILED DESCRIPTION OF THE ILLUSTRATED EMBODIMENTS

Figure 1:
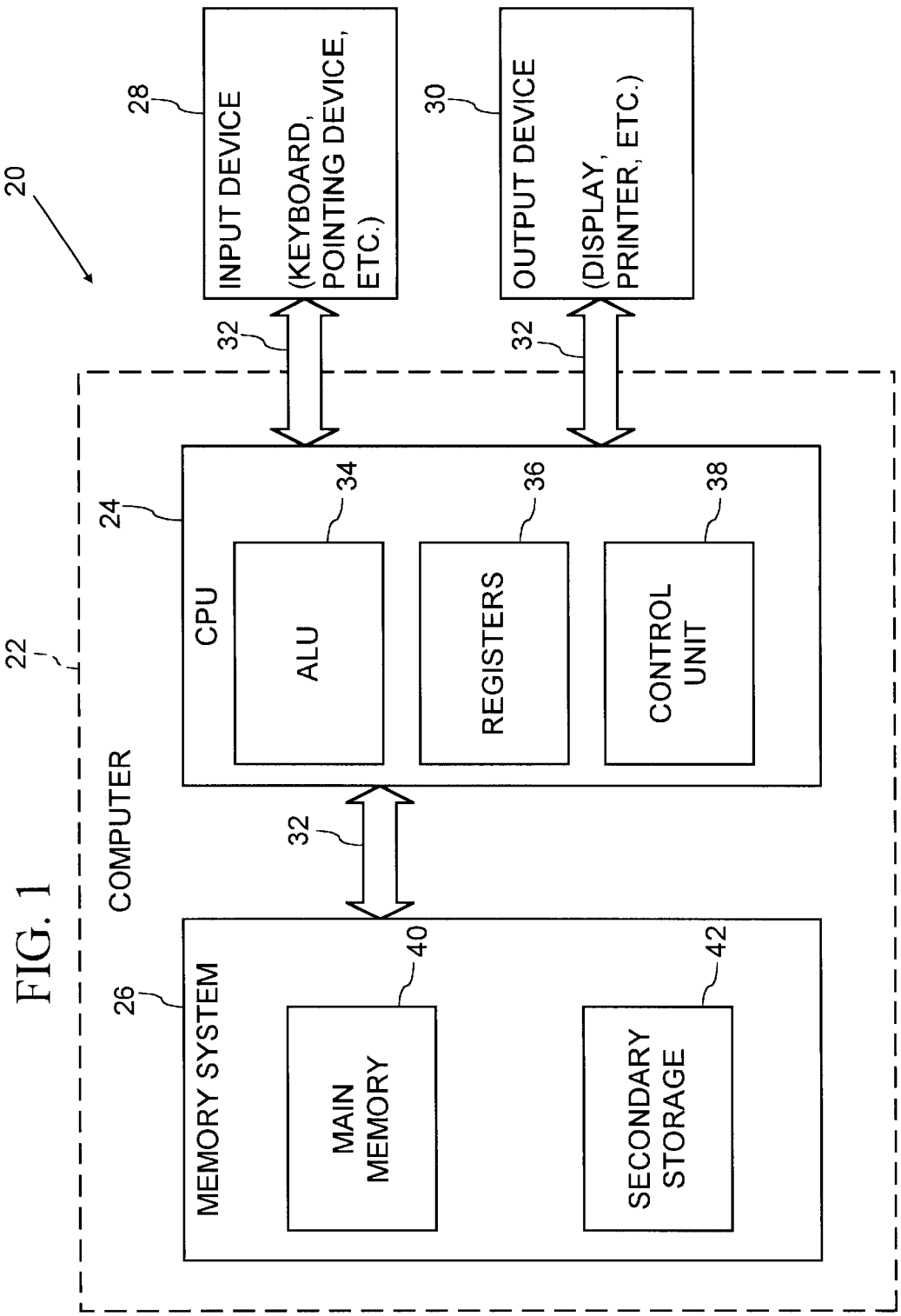
FIG. 1 is a block diagram of a computer system that may be used to implement a method and apparatus embodying the invention for programmatic document printing.

Referring to FIG. 1, an operating environment for an illustrated embodiment of the present invention is a computer system 20 with a computer 22 that comprises at least one high speed processing unit (CPU) 24, in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPc from IBM and Motorola.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28, 30 also are familiar. The input device 28 can comprise a keyboard, a mouse, a physical transducer (e.g., a microphone), etc. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The operating system in the illustrated embodiment is the Windows® 95 or Windows® NT operating systems of Microsoft Corporation, which provide a set of system services referred to as the WIN32 API. It should be understood that the invention also can be implemented on other operating system platforms. The application program is the set of software that performs a task desired by the user, using computer resources made available through the operating system. Both are resident in the illustrated memory system 26.

In accordance with the practices of persons skilled in the art of computer programming, the present invention is described below with reference to acts and symbolic representations of operations that are performed by the computer system 20, unless indicated otherwise. Such acts and operations are sometimes referred to as being computer-executed. It will be appreciated that the acts and symbolically represented operations include the manipulation by the CPU 24 of electrical signals representing data bits which causes a resulting transformation or reduction of the electrical signal representation, and the maintenance of data bits at memory locations in the memory system 26 to thereby reconfigure or otherwise alter the computer system's operation, as well as other processing of signals. The memory locations where data bits are maintained are physical locations that have particular electrical, magnetic, or optical properties corresponding to the data bits.

Object Overview

Figure 2:
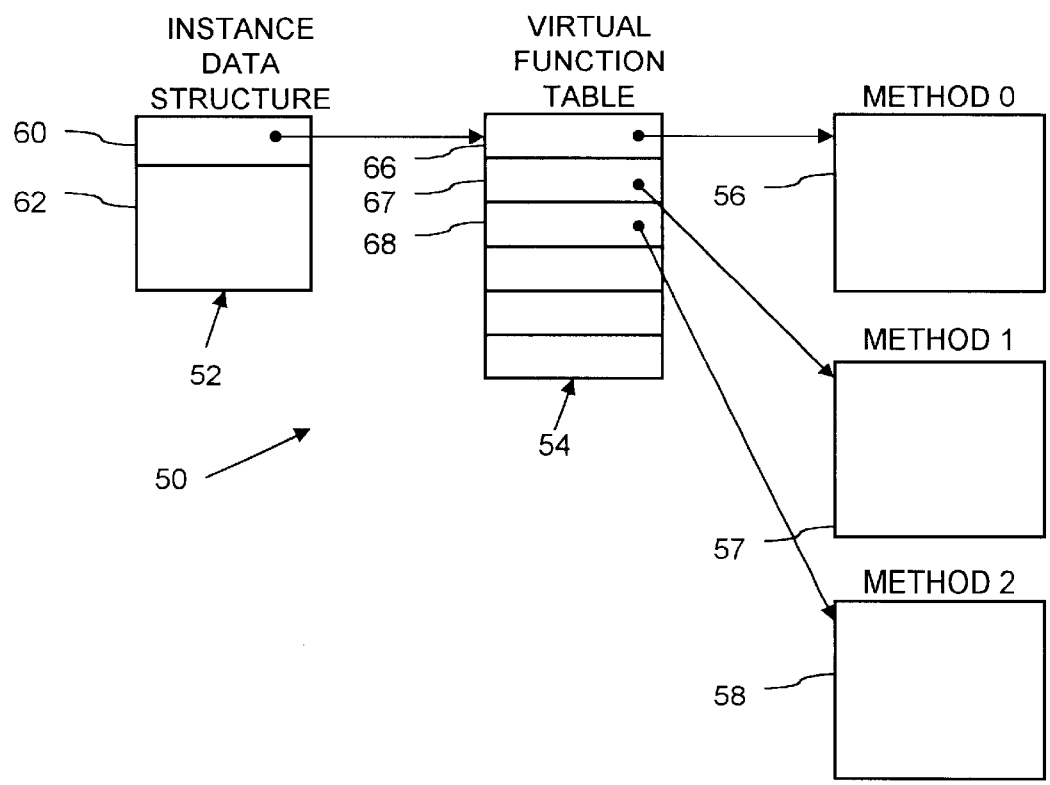
FIG. 2 is a block diagram of typical data structures for an object in the computer system of FIG. 1.

Referring to FIG. 2, the illustrated embodiment of the invention utilizes objects which conform to the component object model (COM) of Microsoft Corporation's OLE. For a detailed discussion of OLE see *Inside OLE, Second Edition* by Kraig Brockschmidt, Microsoft Press, Redmond, Wash. 1995. A brief overview of objects in OLE and associated terminology is provided below before discussing the details of the illustrated embodiment.

An object is an instance of a programmer-defined type referred to as a class, which exhibits the characteristics of data encapsulation, polymorphism and inheritance. Data encapsulation refers to the combining of data (also referred to as properties of an object) with methods (also referred to as member functions of an object) that operate on the data into a unitary software component (i.e., the object), such that the object hides its internal composition, structure and operation and exposes its functionality to client programs that utilize the object only through one or more interfaces. An interface of the object is a group of semantically related member functions of the object. In other words, the client programs do not access the object's data directly, but must instead call functions on the object's interfaces to operate on the data.

Polymorphism refers to the ability to view two similar objects through a common interface, thereby eliminating the need to differentiate between two objects. Inheritance refers to the derivation of different classes of objects from a base class, where the derived classes inherit the properties and characteristics of the base class (which for purposes of OLE are the interfaces of the base class).

OLE's COM specification defines binary standards for objects and their interfaces which facilitate the integration of software components. According to the COM specification, a typical object 50 is represented in the computer system 20 (FIG. 1) by an instance data structure 52, a virtual function table 54, and member functions 56–58. The instance data structure 52 contains a pointer 60 to the virtual function table 54 and data 62 (also referred to as data members, or properties of the object). A pointer is a data value that holds the address of an item in memory. The virtual function table 54 contains entries 66–68 for the member functions 56–58. Each of the entries 66–68 contains a reference to the code 56–58 that implements the corresponding member function.

The pointer 60, the virtual function table 54, and the member functions 56–58 implement an interface of the object 50. Client programs interact with the object 50 by obtaining a pointer (referred to as an interface pointer) to the pointer 60 of the virtual function table 54. OLE includes a type definition of an interface pointer which allows client programs to call member functions on the interface by name through the interface pointer and provides type checking on the function's arguments, as expressed in the following code (in the C++ programming language):

pInterface→MemberFunction( . . . )

Figure 3:
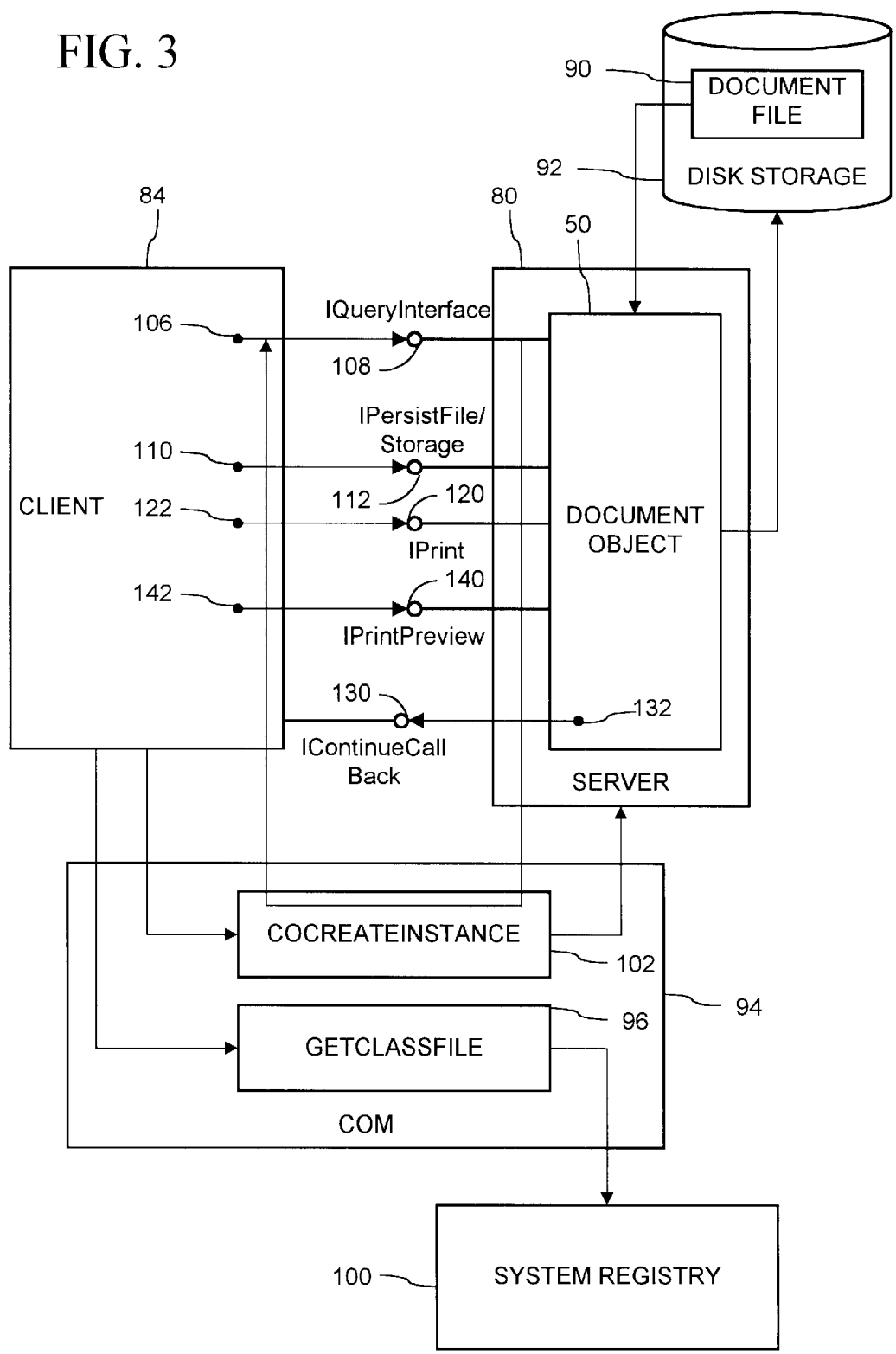
FIG. 3 is a block diagram of an object interface structure with interfaces according to the illustrated embodiment of the invention for programmatically printing documents in the computer system of FIG. 1.

By convention, the interfaces of an object are illustrated graphically as a plug-in jack as shown for the document object in FIG. 3. Interfaces also conventionally are given names beginning with a capital "I." Objects can include multiple interfaces which are implemented with one or more virtual function tables.

The object 50 conforming to the COM specification exhibits data encapsulation by exposing its interfaces (semantic groupings of its member functions) to client programs. The client programs interact with the object 50 by calling the member functions 56–68 on a particular interface of the object, but do not directly manipulate the object's data. The object 50 also exhibits polymorphism and inheritance in that the object 50 can provide interfaces in common with a base class and other similar objects, so that client programs can interact with each of the objects in the same manner by calling member functions of the interface that the objects have in common.

The Document Object and Loading From Storage

Referring now to FIG. 3, the virtual function table 54 and member functions 56–58 of the document object 50 are provided by a server application program 80 which is stored in the computer system 20 (FIG. 1) as an executable program file (with a ".exe" file name extension) or as a dynamic link library file (with a ".dll" file name extension). Dynamic link library files are loaded, dynamically linked, and executed by the Windows® operating system in a same process with a client application program 84. Executable program files are loaded by the operating system as a separately executing process. In accordance with OLE, the server application 80 includes code for the virtual function table 54 and member functions 56–58 of the classes that it supports, and also includes a class factory that generates the instance data structure 52 for an object of the class.

A server application can be written by a programmer to support a particular class of object that contains any desired data. More specifically, a programmer can write server applications which provide objects that contain the data of a particular variety of computer document, such as a text document, spreadsheet, drawing, etc. These objects which contain document data are referred to herein as document objects. For example, software application programs such as Microsoft® Word can be written as a server application in which the application program's documents are represented as OLE objects. This allows another client program 84 to interact with the document through interfaces of the document object 50.

For the client program 84 to interact with the document object 50 provided by the server application 80, the server application must first create the object (i.e., instantiate an object of a class supported by the server application) and the client program 84 must gain an interface pointer to the object 50. In OLE, the client program 84 realizes these events using services provided by OLE and a set of standard object interfaces defined by COM based on class and interface identifiers assigned to the object's class and interfaces. More specifically, the services are available to client programs as application programming interface (API) functions provided in the COM library 94, which is part of a component of the Windows® operating system in a file named "OLE32.DLL." In OLE, classes of objects are uniquely associated with class identifiers ("CLSIDs"). Class identifiers are 128 bit globally unique identifiers that the programmer creates with an OLE service named "CoCreateGUID" and assigns to the respective classes. The interfaces of an object are associated with interface identifiers.

For example, FIG. 3 illustrates the particular situation where the client program 84 begins with a file 90 containing document data stored on a hard disk or other persistent storage device 92 (i.e., secondary storage 42) of the computer system 20 (FIG. 1), but lacks any other information (e.g., a class identifier) of the server application 80 which operates on the variety of document stored in that file. This is a typical situation for a client program that implements a programmatic printing feature where the user indicates a document file that is to be printed (e.g., by dragging an icon representing the file onto a printer icon).

FIG. 4 illustrates a method 150 of programmatically printing the document file with the document object 50 which uses programmatic print interfaces described below. As a first step 152 in creating the document object 50, the client program 84 first retrieves the class identifier associated with the document data. OLE provides several API services with which the class identifier can be retrieved, and several ways in which class identifiers are associated with stored data. If the file is stored in the OLE structured storage format, then the class identifier(s) are stored together with the data stream in the file. The client program 84 can retrieve the class identifier of files known to be stored in this structured storage format with the OLE API services, "ReadClassStg" and "ReadClassStm."

More generally, the client program 84 can retrieve the class identifier for files not known to have the structured storage format with the OLE API service 96 named "GetClassFile." In addition to associating class identifiers with stored data in the structure file format, OLE also provides ways of associating other files with class identifiers based on the file name extension or characteristics of the data stored in the file using information in a system registry 100. OLE uses system registry entries which specify the class identifier for files having a specific file name extension, or having data contents matching specific bit patterns to associate other non-structured storage format files with a class identifier. The registry entries to specify the class identifier of files with a particular file name extension have the following form:

```
<ext> = <ProgID>
<ProgID> = <Name of class>
        CLSID = {<CLSID in hex>}
CLSID
        {<CLSID in hex>}
                [Inproc | Local]Server32 = <path to server>
```

These entries are stored under the root registry key,

HKEY_CLASSES_ROOT.

The entries to associate a file containing data matching a specific bit pattern to a class identifier are stored under the root registry key named "FileType," and have the following form:

```
FileType
        {<CLSID in hex>}
                <type id> = <offset>,<cb>,<mask>,<value>
```

Each <type id> key, which is a unique integer for the CLSID, describes a byte pattern <value> that will match <cb> bytes in an associated file found at <offset> (from the beginning of the file) when a bitwise AND operation has been performed on those file bytes with <mask> (which may be omitted to indicate that no mask is necessary).

If the file 90 has the OLE structured storage format, the GetClassFile API reads its associated class identifier which is stored directly in the file. If not, the API will attempt to match the file's data against any pattern matching entries in the system registry and uses the class identifier associated with a matching pattern from the system registry 100. If the file doesn't match any pattern, the API will associate the file with a class identifier by file name extension. Otherwise, the API returns a failure.

After the client program 84 obtains the class identifier associated with the file 90, the client program 84 causes the server application 80 to create the document object 50 at step 153. The client program 84 calls a second OLE API service 102 named, "CoCreateInstance." The API 102 also uses the system registry 96 to look up the server application 80 which supplies objects of the class associated with the class identifier. The API 102 then loads the server into the memory 40 of the computer system 20 (FIG. 1), and causes the class factory in the server application 80 to create an object of the class identified by the class identifier. The class factory returns an interface pointer 106 to an interface (generally to an interface 108, named "IUnknown") of the object to the CoCreateInstance API 102, which returns the interface pointer to the client program 84.

Once the client program 84 has obtained a first interface pointer to the object 50, the client obtains pointers to other desired interfaces of the object using the interface identifier of the desired interface as indicated at steps 154, 156. COM defines several standard interfaces generally supported by OLE objects including the IUnknown interface 108. This interface includes a member function named "QueryInterface." The QueryInterface function can be called with an interface identifier as an argument, and returns a pointer to the interface associated with that interface identifier. By convention, the IUnknown interface's member functions are included as part of each interface on an object. Thus, any interface pointer that the client obtains to an interface of the object 50 can be used to call the QueryInterface function.

At step 154, the client program 84 calls the QueryInterface function to obtain a pointer 110 to an interface 112 for causing the document object to load its document data from the file. COM defines standard interfaces which objects can support to persistently store and load their data members from a persistent data storage device of the computer system. These interfaces include the "IPersistStorage" and "IPersistFile" interfaces. Objects with the IPersistStorage interface store data in a file with the OLE structured storage format. Objects which implement the IPersistFile interface store and load data from a file without the OLE structured storage format. These interfaces each include a "load" member function which the client program 84 calls at step 155 to cause the document object 50 to load its data from the file 90.

At steps 157–158, the client program 84 causes the document object 50 to print the document, and continues interacting with the document object 50 to allow print progress or status reporting by the client program 84 to the user and cancellation of printing. These steps use the programmatic printing interfaces described below.

Programmatic Printing Interfaces

Referring again to FIG. 3, the document object 50 and the client program 84 according to the illustrated embodiment of the invention further include interfaces for the client program 84 to programmatically print and print preview the document with the document object 50. The document object 50 provides a print interface 120 (named "IPrint") and a print preview interface 140 (named "IPrintPreview"). The client program 84 obtains an interface pointer 122, 142 to call member functions on these interfaces of the document object 50 by calling the QueryInterface function on the IUnknown interface as described above. The client program 84 can call member functions on these interfaces after the document object's data has been loaded from persistent storage by the call to the IPersistFile/IPersistStorage::Load function. The client program 84 also provides a call back interface 126 (named "IContinueCallBack"). The client program 84 passes an interface pointer 132 for its call back interface 130 to the document object 50 as described below.

The Print Interface

The print interface 120 of the document object 50 provides three member functions in the illustrated embodiment, named "SetInitialPageNum," "GetPageInfo," and "Print." The print interface 120 of the document object 50 is defined as follows:

```
interface IPrint: IUnknown
    {
        HRESULT SetInitialPageNum([in] LONG nFirstPage);
        HRESULT GetPageInfo([out] LONG *nFirstPage; [out]
                LONG *pcPages);
        HRESULT Print([in] DWORD grfFlags, [in,out]
                DVTARGETDEVICE **pptd, [in,out]
                PAGESET **ppPageSet, [in,out]
                STGMEDIUM **ppstgmOptions, [in]
                IContinueCallback* pCallback, [in] LONG
                nFirstPage, [out] LONG *pcPagesPrinted,
                [out] LONG *pnPageLast);
    };
```

The notation in square brackets indicates whether the parameter serves as both input to the document object 50 and output from the document object to the client program 84.

Once the document object is loaded with its document data, the client program 84 calls the print member function on the print interface (i.e., IPrint::Print) to instruct the document object to print its respective document (step 157 of FIG. 4). In its call to the print member function, the client program 84 specifies as call parameters: printing control flags, the target device (i.e., the destination printer), the pages to print, and document specific printing options. The arguments and return value of the print member function are summarized in the following tables:

TABLE 1

Iprint::Print Parameters

| Argument | Type | Description |
| --- | --- | --- |
| grfFlags | DWORD | A bit field whose values are taken from the enumeration PRINTFLAG. |
| pptd | DVTARGETDEVICE** | The target device on which the printing is to occur. |
| ppPageSet | PAGESET** | Indicates which pages are to be printed. |
| ppstgmOptions | STGMEDIUM** | Contains object-specific printing options in the form of a serialized OLE property set. May be NULL in one or both directions. |
| pCallback | IContinueCallback* | A callback interface which is to be periodically polled at human-response speeds to determine whether printing should be abandoned. May be NULL. |
| nFirstPage | LONG | The starting page number to print. This overrides any value previously passed to IPrint::SetInitialPageNum. |
| pcPagesPrinted | LONG* | The place at which the object is to return the actual number of pages that were successfully printed. |
| pnLastPage | LONG* | The place at which the object is to return the last legal page number. |

TABLE 2

IPrint::Print Return Values

| Return Value | Meaning |
| --- | --- |
| S_OK | Success |
| PRINT_E_CANCELLED | The print process was canceled. *pcPagesPrinted indicates the number of pages that were in fact successfully printed before this occurred. |
| PRINT_E_NOSUCHPAGE | An attempt has been made to print a page which does not exist. |
| E UNEXPECTED | An unexpected error occurred. |

The control flags parameter is passed in a double word data value. The flags and their meaning are enumerated in the following table:

TABLE 3

Print Control Flags.

| Value | Description |
| --- | --- |
| PRINTFLAG_MAYBOTHERUSER | Specifies whether any interaction is permitted with the user at all. Unless this flag is set, no part of the printing process may interact with the user. |
| PRINTFLAG_PROMPTUSER | Only valid if PRINTFLAG_MAYBOTHERUSER is specified. Prompt the user for job-specific printing options using the normal print dialog for the object. Support for this option is required. |
| PRINTFLAG_USERMAYCHANGEPRINTER | Only valid if PRINTFLAG_PROMPTUSER is specified. Indicates that the user may change the printer to be printed to; in the absence of this flag, the user must print on the printer provided. |
| PRINTFLAG_RECOMPOSETODEVICE | Indicates that the object should attempt to recompose itself to the indicated target device. In the absence of this flag, the object should retain any existing compositional-device association that it may happen to presently have if at all possible. |
| PRINTFLAG_DONTACTUALLYPRINT | Carry out any indicated user-prompting and object-recomposing actions as indicated, but don't actually carry out the printing operation. |
| PRINTFLAG_PRINTTOFILE | The object should print to the file, name of which is passed through "portname" field of DVTARGETDEVICE. |

The target device parameter specifies the destination device to which the document object prints its document. The parameter is a pointer to a data structure of an OLE data type named DVTARGETDEVICE. This data structure includes a device mode field ("DEVMODE") in which the client program 84 can specify whole-job printer-specific options, such as number of copies, paper size, print quality, etc. The data structure may or may not also contain orientation information in an orientation field (this is indicated in the dmFields field of the data structure). If the orientation field is present in the client program's call to the print member function, then the document object uses the paper orientation specified in the field. If absent, then the object applies a natural orientation as determined by the object's content.

The page set parameter is a pointer to a data structure which Identifies a series of page-ranges in the document to be printed, and optionally identifies printing of only the even or odd pages of the document. The data structure is summarized in the following table:

TABLE 4

IPrint::Print Page Set Data Structure

| Member | Type | Description |
| --- | --- | --- |
| cbStruct | ULONG | The number of bytes in this instance of the PAGESET structure. Must be a multiple of 4. |
| fOddPages | BOOL | If true then only the odd-numbered pages in the page-set indicated by rgPages are to be printed. |
| fEvenPages | BOOL | If true, then only the even-numbered pages in the page-set indicated by rgPages are to be printed. |
| cPageRange | ULONG | The number of page-range pairs specified in rgPages. |
| rgPages | PAGERANGE * | Specifies the pages to be printed. The page ranges must be sorted in increasing order and non-overlapping. It is an error to attempt to print a page which does not exist. |

As shown in the above table the page set data structure includes a set of page range data structures (the PAGERANGE data type). Each page range data structure identifies a single range of pages. If the nFromPage value is greater than the nToPage value, the pages are printed in the reverse order.

TABLE 5

Page Range Data Structure.

| Member | Type | Description |
| --- | --- | --- |
| nFromPage | LONG | The first page to print. The first page of a document is 1. |
| nToPage | LONG | The last page to print. A special value of PAGESET_TOLASTPAGE indicates that all the remaining pages should be printed. |

User Interface Display

The client program 84 controls display of user interface elements by the document object 50 with the print flags, PRINTFLAG_MAYBOTHERUSER, PRINTFLAG_PROMPTUSER, and PRINTFLAG_USERMAYCHANGEPRINTER. These flags have the effects summarized in the above Table 3. The client program can prevent the document object from displaying any user interface elements by clearing the PRINTFLAG_MAYBOTHERUSER print flag. The client program 84 can thus use this print flag setting to prevent the document object 50 from displaying graphical elements that could obscure the client program's user interface and work that the user is performing in the client user interface.

Alternatively, the client program 84 can set the PRINTFLAG_MAYBOTHERUSER, and PRINTFLAG_PROMPTUSER flags to cause the document object 50 to display a print options dialog or like user interface elements for gathering user input that determines aspects of the print operation.

Opaquely Conveying Document Object-Specific Print Options

Referring to FIG. 5, the print member function also allows the client program 84 to convey a set of print options to the document object in an opaque manner. More specifically, the client program 84 can pass a set of print options which are not set by itself, but rather by the document object or another object of the same or like class.

The print member function parameters pptd and ppPageSet are both input and output to allow for the possibility of user interaction with the document object in the print operation (as determined by the setting of the PRINTFLAG_PROMPTUSER flag). In the absence of user interaction (that is, where the PRINTFLAG_PROMPTUSER is cleared), both the target device and the page set parameters will necessarily be the same on input and output. However, if the document object 50 is allowed to prompt the user for print options, then the document object 50 returns target device and page set parameter information actually chosen by the user during interaction.

The ppstgmOptions parameter also is both an input and output parameter of the print member function. On exit from the print member function, the document object 50 returns through the *ppstgmOptions parameter any object-specific information that it would need to reproduce this exact print job. Examples might include whether the user selected "sheet, notes, or both" in a spreadsheet application. The data returned is in the format of a serialized property set (a data structure defined in OLE). The client program 84 can later utilize the returned property set by passing it back in a subsequent call to the same object or another object of the same class. In a subsequent call to the same object, the client program 84 can set different print flags to control user interaction, different target device, etc. Thus, the caller can cause the exact same document to be printed multiple times in slightly different printing contexts (to different printers, etc.)

FIG. 5 illustrates a method 200 in which the client program 84 causes the document object 50 to gather document object-specific print options from the user, and later opaquely conveys the print options to cause printing with the same print options in a different context (e.g., by another document object, another printer, etc.). At a step 202, the client program 84 calls the print function on the print interface of the document object 50, and sets the prompt user print flag (PRINTFLAG_PROMPTUSER). This causes the document object 50 to display user interface elements with which the user can set document specific print options (e.g., a print options dialog) at step 203. When the user has chosen the print options, the document object serializes the print option settings chosen by the user into a property set data structure and outputs the property set to the client program 84 as the print function's input/output parameter, ppstgmOptions (step 204). The client program 84 can cause the document object 50 to gather the document object-specific print options from the user in the steps 202–204 without actually printing the document by setting the print flag, PRINTFLAG_DONTACTUALLYPRINT.

At step 205, the client program 84 passes the property set representing the object specific print options in a later call to the print function. This later call can be to the same document object 50 so as to cause printing of the same document in a different context (e.g., to another printer). Alternatively, the document object 50 can make this call to the print function on the print interface of another document object which utilizes the same print options (i.e., objects of the same class or derived from the same base class). The client program 84 can thus set print flags allowing user interaction to set print options in a first call to one of a group of document objects. Then, the client program 84 can pass the same print options to the remaining document objects to cause them to print their respective documents using the same print options without again requiring user interaction.

With these input and output parameters, the client program 84 can allow a document object 50 to set print options which the client program 84 can use for subsequent print operations. Since the client program 84 can allow the document object 50 to set the parameters and then opaquely convey the parameter values in subsequent print operations, the client program 84 need not contain code to manipulate any print operations specific to a particular document.

The SetInitialPageNum and GetPageInfo Member Functions

The print interface of the document object 50 also includes a set initial page number and a get page information member functions.

The client program 84 calls the set initial page number member function to set the number of the first page of the document. Where the setting of the first page number of the document can not be reflected in the printing output, the document object does not allow setting of the first page number and returns a failure. The illustrated set initial page number function has the following form:

HRESULT IPrint::SetInitialPageNum([in] LONG nFirstPage)

The parameter and return value of the set initial page number function are described in the following table:

TABLE 6

IPrint::SetInitialPageNum Parameters

| Argument | Type | Description |
| --- | --- | --- |
| nFirstPage | LONG | The desired first page number. |

TABLE 7

IPrint::SetInitialPageNum Return Values

| Return Value | Meaning |
| --- | --- |
| S_OK | The first page was set as requested. |
| E_FAIL | The first page could not be set to the indicated value. |
| E_UNEXPECTED | An unknown error occurred. |

The client program 84 calls the get page information member function to query the document object for information about the pages in the document. The client program 84 can use this information for displaying pagination information to the user. This function has the following form:

HRESULT IPrint::GetPageInfo([out] LONG *nFirstPage, [out] LONG *pcPages)

The parameters and return value of the get page information member function are summarized in the following tables:

TABLE 8

IPrint::GetPageInfo Parameters

| Argument | Type | Description |
| --- | --- | --- |
| pnFirstPage | LONG* | Location to return the page number of the first page. May be NULL, indicating the caller |

TABLE 8-continued

IPrint::GetPageInfo Parameters

| Argument | Type | Description |
| --- | --- | --- |
| | | doesn't need this number. If IPrint::SetInitialPageNum has been called, this should contain the same value passed to that method. Otherwise the value is the document's internal first page number. |
| pcPages | LONG* | Location to return the total number of pages in this document. May be NULL, indicating the caller doesn't need this number. |

TABLE 9

IPrint::GetPageInfo Return Values

| Return Value | Meaning |
| --- | --- |
| S_OK | Success. |
| E_UNEXPECTED | An unexpected error occurred. |

Printing a Group of Documents with Consecutive Page Numbers

Referring to FIG. 6, the client program 84 uses the get page information and set initial page number member functions in a method 250 to programmatically print a group of documents with consecutive page numbering. This is particularly useful for client programs, such as the Binder application in the Microsoft® Office application program suite, whose objective is to manage related documents having different varieties as a group.

At a first step 252 of the method 250, the client program 84 first loads the documents as document objects as described in the method 150 (FIG. 4) above. At step 253, the client program 84 calls the get page information member function on each objects' print interfaces to retrieve the number of pages in each document.

At the step 254, the client program 84 sets the page number of the first document object 50 to one by calling the document object's set initial page number member function. Then, the client program 84 repeats steps 255–257 in a loop. At step 255, the client program 84 prints the document by calling the print member function. At step 256, the client program 84 exits the loop of steps 255–257 if all the documents in the group have been printed. Otherwise, the client program 84 sets the initial page number of the next document to the initial page number of the current document plus the number of pages in the current document with the set initial page number function of that document object 50 at the step 257, and repeats the loop of steps 255–257 for a next document object of the group.

Registering Document Objects with the Print Interface.

In the illustrated computer system 20 (FIG. 1), each document object 50 that supports the print interface (IPrint) registers this fact in the system registry. This allows client programs to determine whether a particular class supports programmatic printing. The document object 50 registers its support of the print interface by marking its class identifier as "printable" using a registry entry with the following form:

HKEY_CLASSES_ROOT\CLSID\{ . . . }\Printable

The Call Back Interface

With reference again to FIGS. 3 and 4, the client program 84 at the step 158 can control during programmatic printing whether or not the printing should continue and provide progress monitoring displays to the user. For example, the client program 84 may support a "Stop Print" or "Cancel" command that the user can activate to terminate the print job as soon as possible. The client program 84 also may support displaying a "% complete" progress indicator bar. To support this capability, the illustrated client program 84 implements a small notification sink object with the call back interface 130, named IContinueCallback, having the following form:

Interface IContinueCallback: IUnknown
{
    HRESULT FContinuePrinting([in] LONG
        cPagesPrinted, [in] LONG nCurrentPage,
        [in] LPOLESTR pszPrintStatus);
};

The client program 84 passes a pointer to this interface into the document object 50 as the pCallback parameter in a call to the print function on the print interface of the document object 50 at the step 157 of FIG. 4. When passed a non-null call back parameter, the document object 50 periodically calls back to the FContinuePrinting function of the client program 84 during printing. Preferably, the document object's implementation of the print function calls back to the continue printing function after printing each page of the document so that the client program can provide useful visual feedback to the user about the progress of the print operation. Where the pages of a document are complex, the document object 50 can call back through the continue printing function multiple times per page to allow the client program 84 (or user through the client program) to cancel the print operation at mid-page.

In its call to the continue printing function, the document object 50 passes parameters indicating the number of pages that have been printing, the number of the page being printed, and an additional string describing the print status that the client may choose to display to the user (such as "Page 5 of 19"). The client can respond to the document object's call with a return value directing the document object 50 to continue printing, or a return, value directing the document object 50 to terminate printing. Details of the arguments and return values of the continue printing function are shown in the following tables.

TABLE 10

Continue Printing Function Parameters

| Argument | Type | Description |
| --- | --- | --- |
| cPagesPrinted | LONG | The total number of pages printed so far. |
| nCurrentPage | LONG | The page number of the current page being printed. |
| pszPrintStatus | LPOLESTR | Status message about the print job which the recipient of this call may choose to display to the user. May be NULL. |

TABLE 11

Continue Printing Function Return Values

| Return Value | Meaning |
|---|---|
| S_OK | Continue printing. |
| S_FALSE | Cancel the print job as soon as possible |
| E_UNEXPECTED | An unknown error occurred. |

Print Preview

With reference to FIG. 3, the illustrated embodiment of the invention also provides support for programmatically print previewing documents. The illustrated document object 50 supports programmatic print previews with the print preview interface 140, which has the following form:

```
typedef struct tagPREVIEWSET {
    ULONG cbStruct;
    RECTL rcPreferred;
    DWORD dwReserved;
    ULONG cPreviews;
    ULONG rgbPreview[];           // size is [cPreviews+1]
}PREVIEWSET;
interface IPrintPreview: IPrint {
    HRESULT       PrintPreview(DWORD grfFlags,
        DVTARGETDEVICE* ptd, PAGESET*
        pPageSet, STGMEDIUM* pstgmOptions,
        IContinueCallback* pCallback, LONG
        nFirstPage, LONG* pcPagesPrinted, LONG*
        pnPageLast, STGMEDIUM*
        pstgmPreviews);
}
```

The print preview interface is an extension of the print interface, and contains a print preview member function. The parameters and return values of the print preview member function are summarized in the following tables.

TABLE 12

IPrintPreview::PrintPreview Parameters

| Argument | Type | Description |
|---|---|---|
| grfFlags | DWORD | A bit field whose values are taken from the enumeration PRINTFLAG. No user interaction is permitted via PrintPreview, so user-interaction specific flags are ignored by the document object, as is PRINTFLAG_DONTACTUALLYPRINT. |
| rcPreferred | RECTL | The preferred size of each page of output, in HIMETRIC. Some objects may use this information to perform text or picture "greeking" to improve preview generation and subsequent rendering performance. |
| ptdPreview | DVTARGETDEVICE* | The target device to format the previews for. Usually NULL, indicating the preview images will be rendered to the screen. |
| ptd | DVTARGETDEVICE* | The target device on which the printing is to occur. |
| pPageSet | PAGESET* | [in] Identifies the specific pages to be printed. |
| pstgmOptions | STGMEDIUM* | [in] Contains object- |

TABLE 12-continued

IPrintPreview::PrintPreview Parameters

| Argument | Type | Description |
|---|---|---|
| | | specific printing options in the form of a serialized OLE property set. |
| pCallback | IContinueCallback* | A callback interface which is to be periodically polled at human-response speeds to determine whether printing should be abandoned. May be NULL. |
| pcPagesPrinted | LONG* | The place at which the object is to return the actual number of pages that were successfully printed. |
| pnLastPage | LONG* | The place at which the object is to return the last legal page number. |
| pstgmPreviews | STGMEDIUM* | [in,out] Location to return STGMEDIUM containing a serialized PREVIEWSET. May not be NULL. |

TABLE 13

IPrintPreview::PrintPreview Return Values

| Return Value | Meaning |
|---|---|
| S_OK | Success |
| PRINT_E_CANCELLED | The print process was canceled. *pcPagesPrinted indicates the number of pages that were in fact successfully printed before this occurred. |
| PRINT_E_NOSUCHPAGE | An attempt has been made to print a page which does not exist. |
| E_UNEXPECTED | An unexpected error occurred. |

The client program 84 calls the print preview member function to direct the document object 50 to generate preview metafiles which represents the appearance of a document's pages as printed on a specific printer. A metafile is a hardware device independent data format. The document object 50 stores the metafiles in a serialized form (such as using the "GetMetaFileBitsEx" and "GetEnhMetaFileBits" OLE APIs) into a preview set data structure summarized in the following table.

TABLE 14

Preview Set Data Structure.

| Member | Type | Description |
|---|---|---|
| cbStruct | ULONG | The number of bytes in this instance of the PREVIEWSET structure. Must be a multiple of 4. |
| rcPreferred | RECTL | The preferred size in HIMETRIC for displaying the preview metafiles serialized in this structure. |
| dwReserved | DWORD | Reserved for future use. Must be set to 0 and ignored by the receiver. |
| CPreviews | ULONG | The number of preview metafiles contained in this structure. |
| rgbPreview | ULONG* | Array of offsets from the beginning of this structure to individual serialized metafiles. Offsets are always on four-byte boundaries. To simplify programmatic access to this structure, |

TABLE 14-continued

Preview Set Data Structure.

| Member | Type | Description |
|--------|------|-------------|
|        |      | offsets within rgbPreview are in increasing order, and it is always of at least size cPreview+1, with rgbPReview(cPreviews) == cbStruct. This allows consumers to readily calculate the size of any preview, n, as rgbPreview[n+1]-rgbPreview[n]. |

The client program 84 calls the print preview function to programmatically print preview documents in a method similar to the method 150 for programmatically printing documents with the print function. In place of calling the print function on the print interface of the document object 50 at step 157, the client program 84 calls the print preview function on the print preview interface of the document object 50. In its call to the print preview function, the client program 84 also can pass a pointer to its call back interface so as to monitor print progress and allow cancelling of the print preview operation.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. An object-based system for programmatic printing control by a using program of document managing programs on a computer having a printer, the system comprising:
    a system-defined print interface having a print method, wherein the print method accepts a callback interface reference as an argument from the using program;
    a plurality of document managing programs for a plurality of document varieties, each said document managing program operating to provide instances of a document object class specific to the respective document variety of that document managing program, the provided document object class instance encapsulating document data for a document of the respective document variety and exposing the system-defined print interface, the document object class having an implementation of the print method operative when invoked to print a document defined by the document data to the printer, the implementation of the print method in the document object class of at least one of the document managing programs operating to periodically invoke a continue-printing-confirmation method in a callback interface referenced by the callback interface reference and discontinue printing the document to the printer upon the continue-printing-confirmation method returning a negative indication;
    whereby the using program programmatically controls printing by the document managing programs via invoking the print method of the system-defined print interface exposed by the document object instances provided by the respective document managing program, such that no processing of document or print data is done by the using program in said controlled printing by the document managing programs, and
    whereby the using program is periodically given the opportunity to cause the document managing program to discontinue printing the document.

2. The system of claim 1 wherein the implementation of the print method in the document object class of at least one of the document managing programs reports a status of printing to the using program as an argument to the continue-printing-confirmation method invocation, whereby the using program can provide a notification of printing status to a user based on the document managing programs report.

3. An object-based system for programmatic printing control by a using program of document managing programs on a computer having a printer, the system comprising:
    a system-defined print interface having a print method;
    a plurality of document managing programs for a plurality of document varieties, each said document managing program operating to provide instances of a document object class specific to the respective document variety of that document managing program, the provided document object class instance encapsulating document data for a document of the respective document variety and exposing the system-defined print interface, the document object class having an implementation of the print method operative when invoked to print a document defined by the document data to the printer, wherein the print method accepts a control flag indicative of user interaction as an argument from the using program, the implementation of the print method in the document object class operating to suppress display of a user interface by the respective document managing program for interacting with a user if the control flag indicates an absence of user interaction and to enable the user interface if the control flag indicates a presence of user interaction;
    whereby the using program programmatically controls printing by the document managing programs via invoking the print method of the system-defined print interface exposed by the document object instances provided by the respective document managing program, such that no processing of document or print data is done by the using program in said controlled printing by the document managing programs.

4. The system of claim 3 wherein the print method accepts a control flag indicative of whether to prompt a user for input of print options as an argument from the using program, the implementation of the print method in the document object class operating to cause the respective document managing program to prompt the use according to the indication of the control flag.

5. An object-based system for programmatic printing control by a using program of document managing programs on a computer having a printer, the system comprising:
    a system-defined print interface having a print method and an initial page number setting method; and
    a plurality of document managing programs for a plurality of document varieties, each said document managing program operating to provide instances of a document object class specific to the respective document variety of that document managing program, the provided document object class instance encapsulating document data for a document of the respective document variety and exposing the system-defined print interface, the document object class having an implementation of the print method operative when invoked to print a document defined by the document data to the printer, the document object class further having an implementation of the initial page number setting method operative when invoked to set an initial page number of the respective document;

whereby the using program programmatically controls printing by the document managing programs via invoking the print method of the system-defined print interface exposed by the document object instances provided by the respective document managing program, such that no processing of document or print data is done by the using program in said controlled printing by the document managing programs, and whereby the using program programmatically controls the initial page number setting by the document managing programs via invoking the initial page number setting method of the system-defined print interface exposed by the document object instances provided by the respective document managing program, such that the using program causes plural document objects to print their respective documents in a single continuous page number sequence.

6. In a computer having a connected printer, a process for a using program to programmatically control printing of a document by a document processing program, the document processing program defining a document object class specific to a document variety, where instances of the document object class encapsulate individual documents of the document variety and expose a print interface having a print method member, the document processing program having program code implementing the print method member, the process comprising:

on request of the using program, providing by the document processing program an object instance of the document object class for a document of the document variety, the object instance encapsulating data representative of the document and exposing the print interface having the print method member;

on invocation of the print method member by the using program, processing the document-representative data encapsulated in the object instance by the print method member-implementing program code in the document processing program to cause the printer to print the document without processing of document or print data by the using program;

receiving a call back interface reference by the print method member-implementing program code in the document processing program from the using program as an argument of the print method member invocation;

periodically invoking a continue-printing-confirmation method member of the using program via the call back interface reference by the print method member-implementing program code in the document processing program;

reporting a document printing status as an argument of the periodic continue-printing-confirmation method member invocations by the print method member-implementing program code;

receiving a return indication confirming whether to continue printing by the print method member-implementing program code from the using program in response to the periodic continue-printing-confirmation method member invocations;

on a positive return indication, continuing by the print method member-implementing program code to cause the printer to print the document; and on a negative return indication, causing by the print method member-implementing program code termination of the printer printing the document.

7. In a computer having a connected printer, a process for a using program to programmatically control printing of a set of documents by a plurality of document processing programs, the document processing programs each defining a document object class specific to a document variety, where instances of the document object classes encapsulate individual documents of the respective document varieties and expose a print interface having a print method member, the document processing programs having program code implementing the print method member of their respective document object class, the process comprising:

on request of the using program, providing by each of the document processing programs an object instance of the document object class for a document of the document variety, each object instance encapsulating data representative of a document from the set of documents and exposing the print interface having the print method member:

on invocation of the print method member by the using program, processing the document-representative data encapsulated in the object instance by the print method member-implementing program code in the document processing program to cause the printer to print the document without processing of document or print data by the using program;

receiving an initial page number setting by the print method member-implementing program code in the document processing programs from the using program as an argument of the print method member invocation; and setting an initial page number of the document by the print method member-implementing program code according to the received initial page number setting, whereby the using program specifying the initial page number settings for successive documents of the set of documents to consecutively follow a last page number of a preceding document of the set causes the set of documents to be printed in a continuous page number sequence.

8. In a computer having a connected printer, a process for a using program to opaquely convey a set of printing options between separate document printings by at least one document processing program, where said document processing program defines a document object class specific to a document variety, where instances of the document object class encapsulate individual documents of the document variety and expose a print interface having a print method member, said document processing program having program code implementing the print method member, the process comprising:

invoking the print method member a first time by the using program;

receiving a return data structure containing document print options in response to said invoking the print method member;

invoking the print method member a second time by the using program;

passing the return data structure by the using program as an argument of the second print method member invocation, whereby the document print options are conveyed between print method member invocations while the document print options remain opaque to the using program.

9. The process of claim 8 further comprising:

in the first print method member invocation, passing by the using program a prompt-for-print-options print flag as an argument of the first print method member invocation, the prompt-for-print-options print flag causing said document processing program to prompt a user of the computer to input the document print options so as to thereby obtain the document print options opaquely to the using program.

10. The process of claim 8 further comprising:

obtaining references to first and second document object instances by the using program, the first and second document object instances encapsulating respective separate documents;

in the first print method member invocation, invoking the print method member of the first document object; and in the second print method member invocation, invoking the print method member of the second document object, whereby the print options obtained by the first document object instance are conveyed to the second document object instance in a manner opaque to the using program.

11. In a computer having a connected printer, a process for a using program to programmatically cause at least one document processing program to print a group of documents with consecutive page numbering, where said document processing program defines a document object class specific to a document variety, where instances of the document object class encapsulate individual documents of the document variety and expose a print interface having a print method member and a page number setting structure, said document processing program having program code implementing the print method member, the process comprising:

obtaining by the using program references to plural document object instances that encapsulate individual documents;

invoking the document object instances by the using program to set an initial page number of each document object instance's document via the page number setting structure to a number following a final page number of a preceding document according to an order of the documents; and invoking the print method member of the document object instances by the using object to cause the document processing program to print the documents, without the using program processing document or print data, whereby the using program causes the at least one document processing program to print the group of documents with a consecutive page number sequence.

12. A computer readable storage medium having embedded thereon a document processing program with support for a using program to programmatically control the document processing program to print a variety of document, the document processing program comprising:

code operating to provide a run-time instance of a document object class having a print interface with a print method member and encapsulating a document of the variety; and code implementing the print method member and operating on a computer in response to a call from the using program to the print method member of the run-time instance for the using program to cause the document processing program to print the object's document on a printer without processing of document or print data by the using program, wherein the print method member accepts a callback interface reference as an argument from the using program, the code implementing the print method member fisher operating to periodically invoke a continue-printing-confirmation method in a callback interface referenced by the callback interface reference and discontinue printing the document to the printer upon the continue-printing-confirmation method returning a negative indication.

13. A computer readable storage medium having embedded thereon a document processing program with support for a using program to programmatically control the document processing program to print a variety of document, the document processing program comprising:

code operating to provide a run-time instance of a document object class having a print interface with a print method member and encapsulating a document of the variety; and code implementing the print method member and operating on a computer in response to a call from the using program to the print method member of the run-time instance for the using program to cause the document processing program to print the object's document on a printer without processing of document or print data by the using program, wherein the print method member accepts a control flag indicative of user interaction as an argument from the using program, the implementation of the print method in the document object class operating to suppress display of a user interface by the respective document managing program for interacting with a user if the control flag indicates an absence of user interaction and to enable the user interface if the control flag indicates a presence of user interaction.

* * * * *

UNITED STATES PATENT AND TRADEMARK OFFICE
CERTIFICATE OF CORRECTION

PATENT NO. : 6,268,924 B1
DATED : July 31, 2001
INVENTOR(S) : Koppolu et al.

It is certified that error appears in the above-identified patent and that said Letters Patent is hereby corrected as shown below:

<u>Title page,</u>
*Primary Examiner*, "Mancus" should be -- Mancuso --.

<u>Column 10,</u>
Lines 26-29, "form:

<ext>" should be -- form:

<ext> --.

<u>Column 10,</u>
Lines 43-47, "form:

FileType" should be -- form:

FileType --.
Line 48, "<value>" should be -- <value>.... --.

<u>Column 12,</u>
Line 12, "*nFirstPage;" should be -- *nFirstPage, --.

<u>Column 26,</u>
Line 24, "fisher" should be -- further --.

Signed and Sealed this

Fourth Day of June, 2002

*Attest:*

*Attesting Officer*

JAMES E. ROGAN
*Director of the United States Patent and Trademark Office*